United States Patent [19]

Sakawa et al.

[11] Patent Number: 4,970,765
[45] Date of Patent: Nov. 20, 1990

[54] MACHINE TOOL

[75] Inventors: Katsuaki Sakawa, Kasugai; Mitsuo Kobayashi, Yokkaichi; Akira Hirose, Konan, all of Japan

[73] Assignee: Brother Kogyo Kabushiki Kaisha, Japan

[21] Appl. No.: 251,853

[22] Filed: Oct. 3, 1988

[30] Foreign Application Priority Data

Oct. 7, 1987 [JP] Japan ................................ 62-252837

[51] Int. Cl.$^5$ .............................................. B23Q 7/00
[52] U.S. Cl. .................................... 29/33 P; 198/346.1
[58] Field of Search ............... 29/33 P, 563, 568, 565; 408/71; 198/346.1, 465.1, 465.2; 409/136

[56] References Cited

U.S. PATENT DOCUMENTS

| 4,449,277 | 5/1984 | Hasegawa et al. | .................. | 29/33 P |
| 4,505,463 | 3/1985 | Hirai | ........................ | 269/56 |
| 4,512,068 | 4/1985 | Piotrowski et al. | .................. | 29/33 P |

FOREIGN PATENT DOCUMENTS

| 59-201732 | 4/1958 | Japan . | | |
| 0167749 | 8/1985 | Japan | .................................... | 29/565 |
| 29400 | 9/1985 | Japan . | | |
| 30797 | 9/1986 | Japan . | | |
| 265234 | 11/1986 | Japan . | | |
| 24195 | 5/1987 | Japan . | | |

*Primary Examiner*—Z. R. Bilinsky
*Attorney, Agent, or Firm*—Oliff & Berridge

[57] ABSTRACT

A machine tool having pallets each being movable between machining region and non-machining region. At the machining region, there are provided a movable column which supports a spindle head, and a stationary table confronting the column. In front of the stationary table, a workpiece handling station is provided which defines the non-machining region. When one of the pallets is positioned at the machining region for machining to the one of the workpieces, another pallet is brought to the non-machining region, where already machined workpiece is replaced by a new workpiece, and the another pallet is again introduced into the machining region while the first workpiece is still subjected to machining. Machining to the new workpiece is achievable by simply moving the column within the machining region.

9 Claims, 5 Drawing Sheets

MACHINE TOOL

BACKGROUND OF THE INVENTION

The present invention relates to a machine tool having a pallet on which a workpiece is detachably mounted.

In a conventional machine tool such as a machining center or a drilling center, a pallet and a pallet changing device is installed in order to minimize the period for exchanging the workpieces to thereby enhance workability or productivity as described in Japanese Utility Model Publication No. 60-29400. According to such a conventional machine tool, at least two pallets are provided. One of the pallets mounts thereon a workpiece and is positioned at a machining region, whereas another pallets mounts thereon a green workpiece and is positioned outside of the machining region. These pallets are changed with each other by means of the pallet changing device, so that the green workpiece will be brought into the machining region and will undergo machining, and an already machined workpiece will be removed and a new workpiece will be mounted at the region outside the machining region. By such pallet changing operation, workpiece changing operations and machining operations can be concurrently carried out, to thereby occupy an effective machining period among an entire working period. (Relevant techniques are also disclosed in Japanese Utility Model Publication No. 61-30797, Japanese Patent Publication No. 62-24195, Japanese Patent Application Kokai No. 61-265234, and U.S. Pat. No. 4,505,463.)

However, it takes a relatively long time for the pallet changing operation irrespective of automatic or manual pallet changing device. Further, the workpiece cutting operation cannot be made during operation of the pallet changing device. As a result, the effective machining period may be reduced.

Further, in the conventional pallet changing device, a plurality of pallets must be alternately or successively moved between machining region and non machining region of the machine tool. Therefore, intricate mechanism and complex control modes are required for achieving such operation, which in turn, renders the overall device costly.

SUMMARY OF THE INVENTION

It is therefore, an object of this invention to overcome the above-described prior art drawbacks, and to provide an improved machine tool without using the pallet changing device.

Another object of the invention is to provide such machine tool having simplified construction, to thereby provide an inexpensive machine tool.

Still another object of the invention is to provide the machine tool capable of minimizing a dead time starting from completion of machining to one workpiece and ending at the start of machining to a subsequent workpiece.

Briefly, and in accordance with the present invention, there is provided a machine tool including a spindle head, a column supporting the spindle head and movable in a predetermined zone in a first direction, a plurality of pallets for detachably mounting a workpiece, and a table confronting the column for mounting thereon the pallets and for providing a machining region, and the improvement comprises; the plurality of pallets being independently movable between a first position and a second position in a second direction perpendicular to the first direction, and, clamp mechanism for clamping the pallets at least at their first position. The first position is at the machining region, and the second position is at non-machining region outside of the machining region. Further, the table is stationarily provided.

With this arrangement, each of the pallets can be independently positioned at its machining region and non-machining region. Therefore, when one of the workpieces mounted on one of the pallets is subjected to machining at the machining region, another pallet undergoes replacement of the workpiece at the non-machining region and can be moved toward the machining region. As a result, the other pallet can be juxtaposed with the one of the pallets at the machining region. When machining to the on of the workpieces is completed, the column is simply moved within the machining region toward the other pallet for the subsequent machining, so that subsequent machining can be promptly initiated. More specifically, in the present invention, a pallet positioned at the machining region is not replaced with another pallet positioned outside the machining region. Instead, in the present invention, during machining to the first workpiece mounted on the first pallet positioned at the machining region, another pallet on which already machined workpiece is installed is moved away from the machining region, and the latter pallet undergoes workpiece replacement at the non-machining region, and thereafter, the latter pallet on whiCh a new workpiece is mounted is again introduced into the machining region for the subsequent machining. During these steps, the machining to the first workpiece is continuously made. Therefore, no substantial operational suspension occurs during change of the pallets or workpieces, to thereby increase effective machining period to the workpiece.

DETAILED DESCRIPTION OF THE PREFERRED EMBODIMENT

Figure 1:
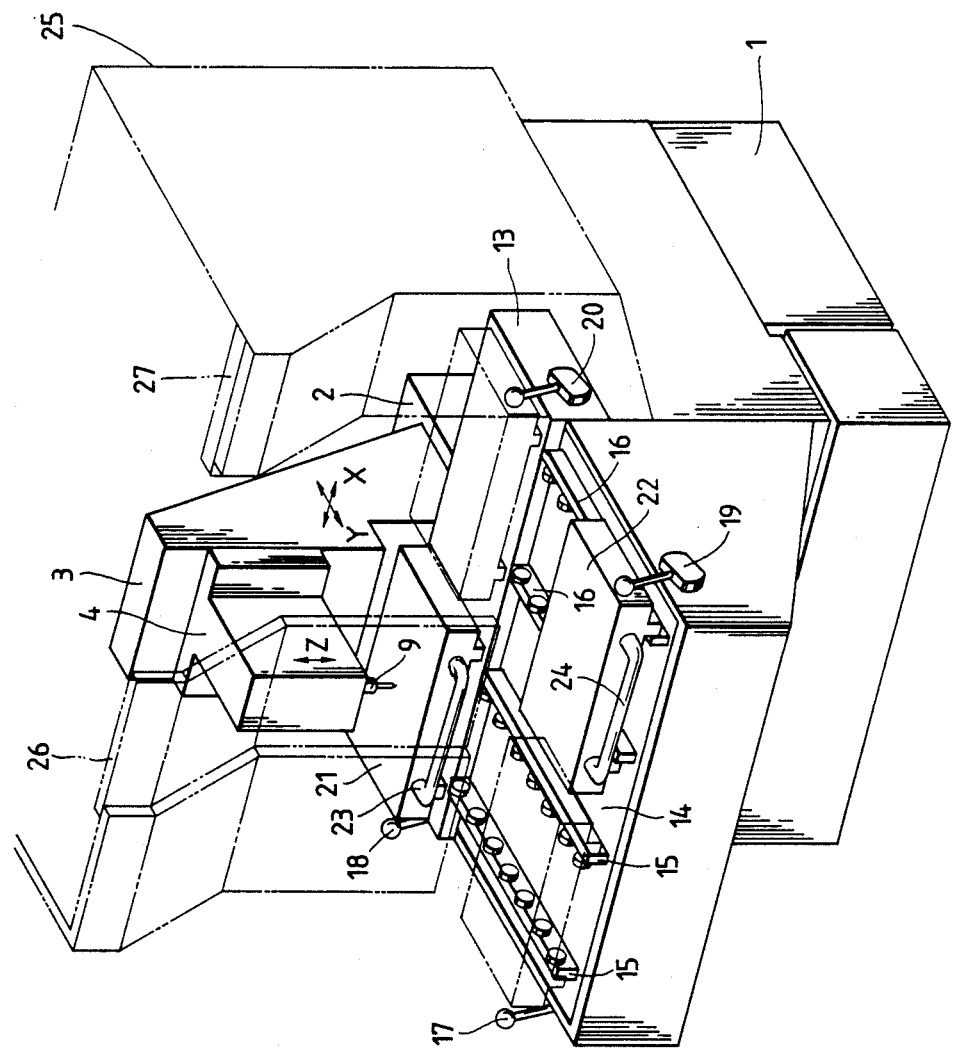
FIG. 1 is a perspective view showing a machine tool according to one embodiment of this invention.
Figure 2:
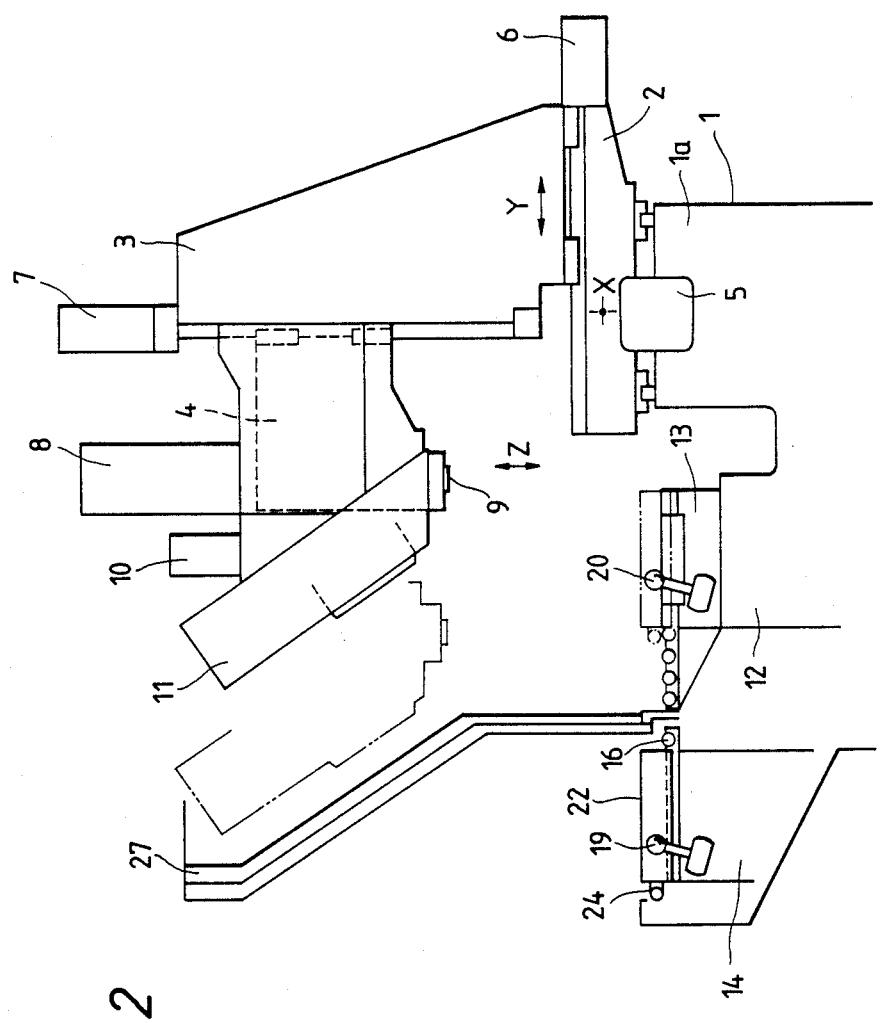
FIG. 2 is a side elevational view showing the machine tool shown in FIG 1.

One preferred embodiment according to this invention will be described with reference to drawings. Throughout the specification, the expressions "front", "rear", "above", "below" and "laterally" are used herein to define the various parts when the machine tool is disposed in an orientation in which it is intended to be used. As shown in FIGS. 1 and 2, a base mount generally includes two sections, that is, a rear portion 1a, and a front table portion 12. A column base 2 is disposed on the rear portion 1a of the base mount, and is slidable with respect thereto in a lateral direction (a first direction or X direction in FIG. 1). On the column base 2, a column 3 is disposed slidable in frontward and rearward directions (a second direction or Y direction in FIG 1). Further, on the column 3, spindle head 4 is disposed slidable in vertical direction (Z direction). The rear portion 1a of the base mount 1 secures a X-axis drive motor 5 drivingly connected to the column base 2 to move the latter, the column base 2 secures a Y-axis drive motor 6 drivingly connected to the column 3, and the column 3 secures a Z-axis drive motor 7 drivingly connected to the spindle head 4. The spindle head 4 is provided with a spindle 9 rotatable about its axis. The spindle head 4 is also provided with a spindle motor 8 connected to the spindle 9 for its rotation. The spindle head 4 further mounts thereon an automatic tool changer (ATC) unit connected to and driven by an ATC motor 10 also mounted on the spindle head 4.

On the table portion 12 of the base mount 1, a stationary table 13 is fixedly secured on which a pair of pallets 21 and 22 can be mounted in-line in the lateral direction (X direction). The first and second pallets 2 and 22 are provided with hand grippers 23 24 at their front faces. The spindle 9 is movable above the stationary table 13 and over the two pallets 21, 22 in the lateral direction because of the sliding movement of &he column base 2 over the base mount 1, so that the upper surface of the stationary table 13 functions as a machining region.

At the front end surface of the base mount 1, a workpiece handling station 14 is fixedly secured, so that the latter is positioned frontwardly relative to the stationary table 13. The handling station 14 serves as a region outside the machining region (non-machining region) where a free open space is provided without being obstructed by neighbouring mechanical components for facilitating workpiece replacement operation such that an already machined workpiece is detached from the pallet and a new workpiece is assembled thereto. On the handling station 14, provided are two pairs of guide means such as roller guides 15 and 16 each extending in the second or Y direction and associated with the stationary table 13. The pallets 21 and 22 can be brought into the pairs of the roller guides 15 and 16, respectively. As a result, each of the pallets 21 22 is alternately movable between its first and second positions or between the stationary table 13 and the handling station 14 (between machining region and non-machining region). One of the pallets 21 and 22 is moved frontwardly or rearwardly along the roller guide 15 or 16 by manually gripping the associated hand grippers 23 or 24.

Clamp mechanisms including first thru fourth clamp means 17, iB, 19 and 20 are provided. The first and third clamp means 17, 19 are provided at the side portions of the handling station 14, and the second and fourth clamp means 18, 20 are provided at the side portions of the stationary table 13. These clamp means are provided at positions corresponding to the respective pallets 21 and 22 for temporarily fixing the same at a position. Known clamping mechanisms are used. For example, the pallets 21 22 are formed with fitting holes (not shown) with which position adjustment pins not shown) are in fitting engagement so as to define frontward and rearward positions of the pallets 21 22 moved toward one of the stationary table 13 and the handling station 14. Thereafter, these pallets 21 22 undergo clamping for preventing these from further movements.

The pallet 21 is subjected to clamping by the clamp means 17 at the handling station 14 and by the clamp means 18 at the stationary table 13 which clamp means are coupled together by a link mechanism not shown) for their cooperation. Similarly, the clamp means 19 and 20 are coupled together by another link mechanism (not shown).

Around the stationary table 13, a protective cover 25 is provided so as to prevent the cutting chips and cutting oil from being dispersed. The protectable cover 25 includes a pair of slide cover members 26 and 27 which are positioned at the boundary between the stationary table 13 and the handling station 14, and are slidably movable in X direction as shown by two dotted chain line in FIG 1. These slide cover members 26 and 27 selectively open and close the paths of the pallets 21 and 22 in Y direction.

Operation will next be described with reference to FIGS. 3 thru 8.

Figure 3:
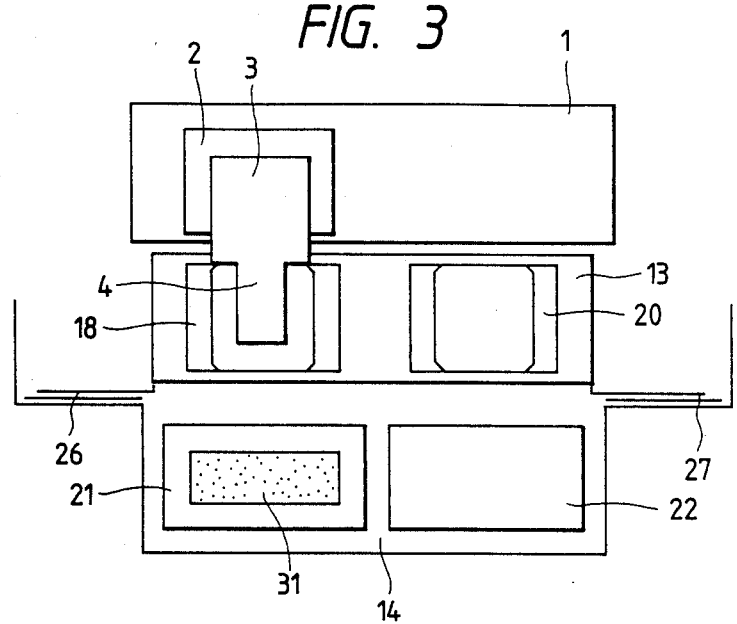
FIGS. 3 thru 8 are schematic plan views for description of an operational sequence for the workpiece changing.
Figure 4:
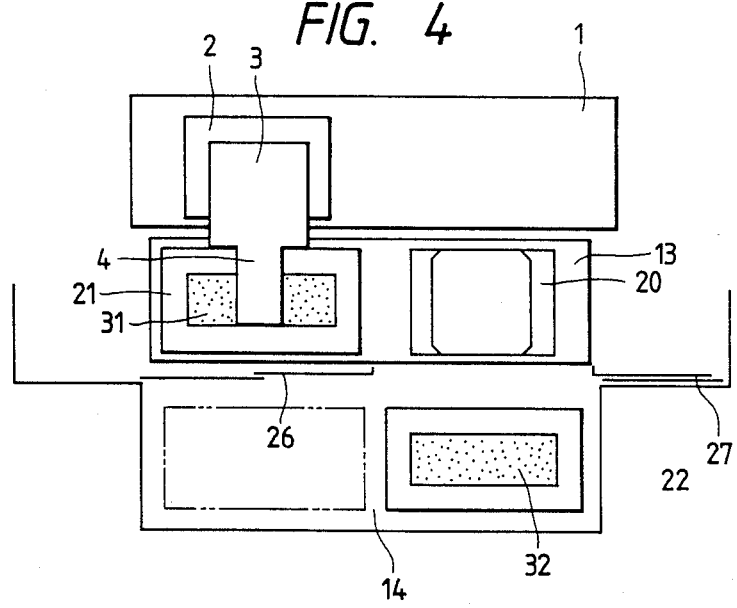
Figure 5:
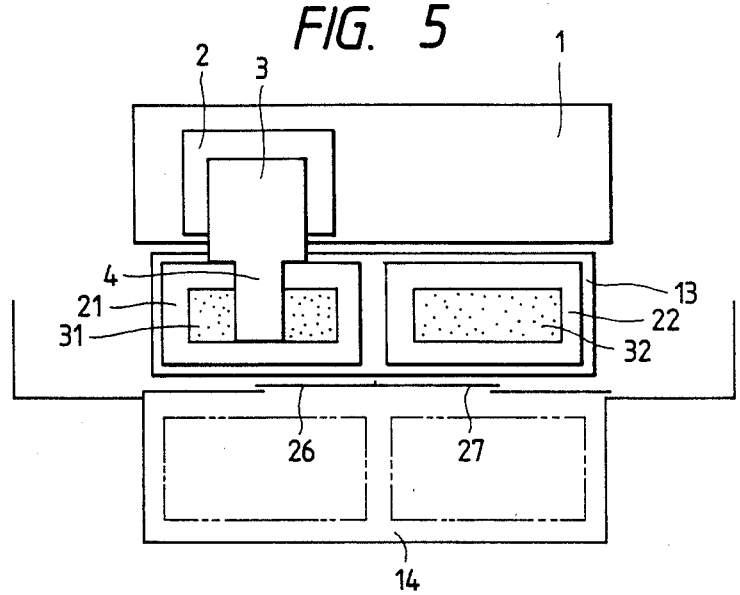

First, as shown in FIG. 3, two pallets 21 and 22 are installed on the workpiece handling station 14, and a workpiece 31 is fixed to &he first pallet 21. In this case, both slide cover members 26 and 27 are opened. Upon completion of the workpiece fixing, the first pallet 21 is fed toward the stationary table 13 and is clamped thereat by the second clamp means 18 as shown in FIG. 4. Thereafter, one of the slide cover members 26 (left side slide cover member in FIG. 4) is closed, and the machining section is energized, so that the workpiece 31 on the first pallet 21 is subjected to machining. During this machining, another workpiece 32 for the subsequent machining is fixed to the second pallet 22 still installed on the handling station 14. After the second workpiece 32 is completely fixed to the second pallet 22, the second pallet 22 is fed toward the stationary table 13 as shown in FIG. 5 and is clamped thereat by the fourth clamp means 20. During this state, the first workpiece 31 is continuously subjected to machining, and the second slide cover member 27 is closed for providing a stand-by state of the second workpiece 32.

Figure 6:
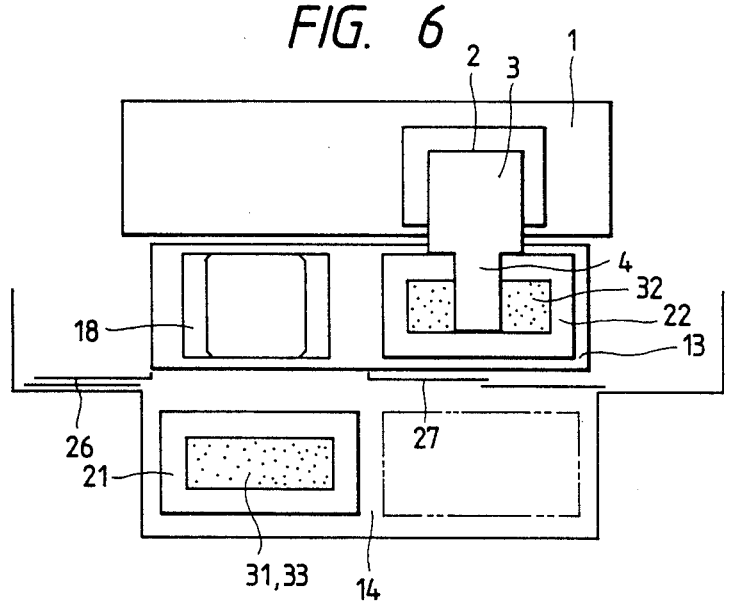

Upon completion of machining to the first workpiece 31, the column 3 is laterally moved toward the second workpiece 32, so that the machining &o the second workpiece 32 is initiated as shown in FIG. 6. During this machining, the first slide cover member 26 is opened, and the second clamp means 18 releases the first pallet 21, so that it is returned to the handling station 14 by way of the roller guide 15. As a result, the first workpiece 32 already machined can be detached from the first pallet 21 and a subsequent workpiece 33 is fixed thereto. Such workpiece changing operation can be made during machining to the second workpiece 32 at an obstruction free, non-machining space, i.e., at the handling station 14.

Figure 7:
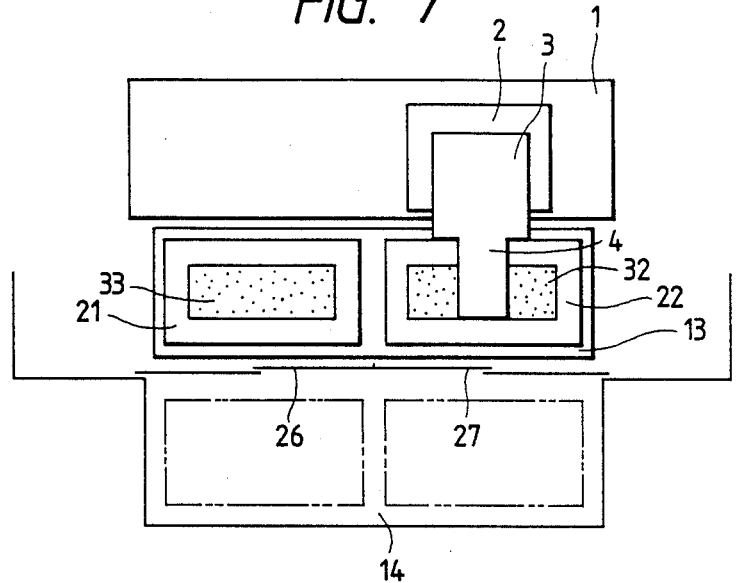

Upon completion of fixing of the third workpiece 33 to the first pallet 21, the first pallet 21 is fed to the stationary table 13 and is clamped by the second clamp means 18. Thereafter, the first slide cover member 26 is closed for providing a stand by state of the machining to the third workpiece 33 as shown in FIG. 7 until the termination of machining to the second workpiece 32.

Figure 8:
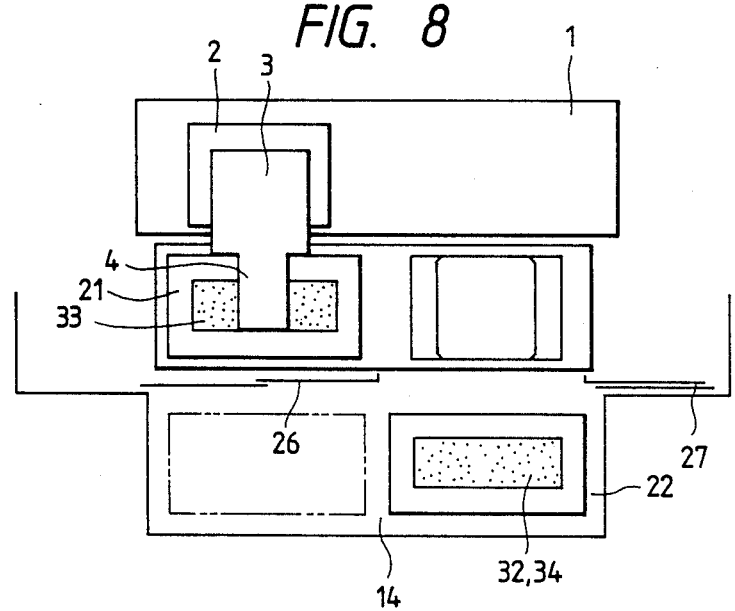

Upon completion of machining to the second workpiece 32 in the second pallet 22, the column 3 is laterally moved toward &he third workpiece 33 as shown in FIG. 8, so that machining to the third workpiece 33 is initiated. During this machining, the second slide cover member 27 is opened and the fourth clamp means 20 releases the second pallet 22, so that it is fed to the handling station 14 by way of the roller guide 16. Thereafter, the second workpiece 32 already machined is replaced by a fourth workpiece 34, and then the second pallet 22 is fed to the stationary table 13 and is clamped thereat by the fourth clamp means 20 for providing a stand-by state of the fourth workpiece 34 until completion of machining to the third workpiece 33. As a result, the condition identical with that shown in FIG. 5 is provided. Such operations are repeatedly carried out.

In summary, in the above operational mode, during machining to one of the workpieces mounted on one of the pallets at the machining region, remaining one of the workpiece can be replaced by a new workpiece at the other pallet positioned outside of the machining region. Accordingly, in the present invention, machining to the workpiece is not interrupted by the workpiece replacement work. Moreover, during machining to the one of the workpieces, the other pallet mounting the new workpiece is again introduced into the machining region for providing a stand-by state for the subsequent machining. Therefore, the subsequent machining to the new workpiece can be promptly initiated by simply moving the column. As a result, effective machining period can be occupied among entire operations, and such replacement work can be carried out at the obstacle free and safe atmosphere.

Further, in the present invention, only required are the mechanism for moving the pallets 21 and 22 frontwardly and rearwardly, and the mechanism for clamping the pallets at their front and rear positions. In other words, in the present invention, it is unnecessary to provide the intricate mechanism for alternately changing pallets as required in the conventional machine tool. Therefore, a simple and inexpensive machine tool results.

In the above-described embodiment, respective pallets 21 and 22 are manually moved between machining and non-machining regions. However, an automatic moving mechanism would be conceivable by using, for example, pneumatic cylinders, each connected to each of the pallets 21 22. Further, semi-automatic moving mechanism would also be available so as to automatically move the pallets in one direction only, such as from the stationary table 13 to the handling station 14.

What is claimed is:

1. A machine tool comprising:
   at least one spindle head;
   at least one column supporting the spindle head and movable in a predetermined zone in a first direction;
   a machining region including a plurality of machining positions juxtaposedly arranged in the first direction, the machining positions being associated with said one column;
   a non-machining region including a plurality of non-machining positions juxtaposedly arranged in the first direction and positions outside of the machining region, the non-machining positions being associated with said one column;
   means for positioning the spindle head at each of the plurality of the machining positions;
   a plurality of pallets associated with said one column for detachably mounting a workpiece, each of the pallets being independently movable between one of the machining positions and one of the non-machining positions in a second direction perpendicular to the first direction, one of the pallets being positionable at one of the machining positions while another of the palettes is movable to be positioned at one of the remaining one of the machining positions or one of the non-machining positions; and
   clamp means for clamping each pallet at least at one of the machining positions.

2. The machine tool as claimed in claim 1, wherein the non-machining region includes a workpiece handling station for changing an already machined workpiece with a new workpiece on pallets positioned at said workpiece handling station, said workpiece handling station being positioned frontwardly with respect to said column.

3. The machine tool as claimed in claim 2, wherein said clamp means comprises first, second, third and fourth clamp means, said first and third clamp means being positioned adjacent said workpiece handling station, and said second and fourth clamp means being positioned adjacent said machining zone.

4. The machine tool as claimed in claim 2, further comprising a pair of guide means provided on said workpiece handling station for guiding movement of said pallets between said first and second positions, said guide means extending in said second direction.

5. A machine tool comprising:
   a spindle having a tip end portion for holding a tool;
   a spindle head for rotatably supporting the spindle;
   a plurality of pallets, each incorporating means for mounting thereon a workpiece, the spindle head being relatively movable with respect to the workpiece on a pallet in first, second and third directions perpendicular to one another, for machining to the workpiece;
   a plurality of machining zones where machining is effected on a workpiece mounted on each of the pallets;
   a plurality of handling zones extending in parallel with the plurality of machining zones for handling the workpiece on the pallet;
   guide means for independently guiding movement of each pallet between one of the machining zones and one of the handling zones, the guide means allowing positioning of one of the pallets at one of the machining zones while allowing movement of another pallet for positioning the other pallet at one of another of the machining zones are one of the handling zones; and
   a column supporting the spindle head, the column being movable to a position in confrontation with a pallet positioned in each of the machining zones by the guide means.

6. A machine tool comprising:
   a single spindle head;
   a single column supporting said single spindle head movable in a predetermined zone in a first direction;
   a plurality of pallets for detachably mounting a workpiece, each of the pallets being movable between a machining region and a non-machining region, toward and away from the single column in a second direction perpendicular to the first direction, the machining region including a plurality of machining positions which are juxtaposedly arranged in the first direction and the non-machining region including an equal plurality of non-machining positions juxtaposedly arranged in the first direction and positioned outside of the machining region;
   a table extending in the first direction and confronting said single column for mounting thereon said pallets and for providing the machining region;
   means for positioning said single spindle head at each of the plurality of machining positions;
   said plurality of pallets each being independently movable in the second direction between one of the machining positions and one of the non-machining positions, one of the pallets being positionable at one of the machining positions while the other pallets are movable to be positioned at one of the other of the machining positions or one of the other of the non-machining positions, and clamp means for clamping each pallet at least at one of the machining positions.

7. A machine tool comprising:

a single spindle having a tip end portion for holding a tool;

a single spindle head for rotatably supporting the single spindle;

a plurality of pallets each incorporating means for mounting thereon a workpiece, the single spindle head being relatively movable with respect to the workpiece on a pallet in first, second and third directions perpendicular to one another, for machining the workpiece;

a plurality of machining zones where machining is effected to a workpiece mounted on one of the pallets;

an equal plurality of handling zones extending in parallel with the plurality of machining zones for handling the workpiece on the pallet;

guiding means for independently guiding movement of each pallet between one of the machining zones and one of the handling zones, the guiding means allowing positioning of one of the pallet at one of the machining zones while allowing movement of another pallet for positioning the other pallet at one of another of the machining zones or one of the handling zones; and a single column supporting the single spindle head, the single column being movable to a position in confrontation with a pallet moved into each of the machining zones by the moving means.

8. A machine tool comprising:

at least one spindle head;

at least one column supporting the spindle head and movable in a predetermined zone in a first direction;

a machining region including a plurality of machining positions juxtaposedly arranged in the first direction, the machining positions being associated with said one column;

a non-machining region including a plurality of non-machining positions juxtaposedly arranged in the first direction and positioned outside of the machining region, the non-machining positions being associated with said one column;

means for positioning the spindle head at each of the plurality of the machining positions;

means for moving the spindle head in first, second and third mutually orthogonal directions while the spindle head is positioned in each of machining positions;

a plurality of pallets associated with said one column, each including means for detachably mounting a workpiece, each of the pallets being independently movable between one of the machining positions and one of the non-machining positions in a second direction perpendicular to the first direction, one of the pallets being positionable at one of the machining positions while another of the pallets is movable to be positioned at one of the remaining one of the machining positions or one of the non-machining positions; and clamp means for clamping each pallet at least at one of the machining positions.

9. A machine tool comprising:

a single spindle head;

a single column supporting said single spindle head and movable in a predetermined zone in a first direction, a plurality of pallets for detachably mounting a workpiece, each of the pallets being movable between a machining region and a non-machining region and toward and away from the single column in a second direction perpendicular to the first direction, the machining region including a plurality of machining positions which are juxtaposedly arranged in the first direction, and the non-machining region including an equal number of non-machining positions juxtaposedly arranged in the first direction and positioned outside of the machining region;

a table extending in the first direction and confronting said single column of mounting thereon said pallets and for providing the machining region;

means for positioning said single spindle head at one of the plurality of machining positions;

means for moving the spindle head in first, second and third mutually orthogonal directions while the spindle head is positioned in each of machining positions;

said plurality of pallets each being independently movable in the second direction, between one of the machining positions and one of the non-machining positions, one of the pallets being positionable at one of the machining positions while another pallets are movable to be positioned at one of the remaining one of the machining positions or one of the non-machining positions, and clamp means for clamping each pallet at least at one of the machining positions.

* * * * *